(12) United States Patent
Chuang

(10) Patent No.: US 7,863,933 B2
(45) Date of Patent: Jan. 4, 2011

(54) TRI-STATE I/O PORT

(75) Inventor: Shih-Jen Chuang, Hsinchu (TW)

(73) Assignee: RDC Semiconductor Co., Ltd., Hsinchu (TW)

( * ) Notice: Subject to any disclaimer, the term of this patent is extended or adjusted under 35 U.S.C. 154(b) by 240 days.

(21) Appl. No.: 12/117,163

(22) Filed: May 8, 2008

(65) Prior Publication Data
US 2009/0150734 A1 Jun. 11, 2009

(30) Foreign Application Priority Data
Dec. 11, 2007 (TW) .............................. 96147246 A

(51) Int. Cl.
*H03K 19/0175* (2006.01)
(52) U.S. Cl. .............................. 326/81; 326/83; 326/86; 327/108; 327/112
(58) Field of Classification Search ............. 326/81–83, 326/86–87; 327/108–109, 112
See application file for complete search history.

(56) References Cited

U.S. PATENT DOCUMENTS

| | | | |
|---|---|---|---|
| 5,831,449 A * | 11/1998 | Shigehara et al. ............. | 326/81 |
| 5,864,244 A * | 1/1999 | Kaplinsky ..................... | 326/58 |
| 6,707,325 B2 * | 3/2004 | Taguchi et al. ............... | 327/112 |
| 7,142,017 B2 * | 11/2006 | Chen ............................. | 326/85 |
| 7,362,145 B2 * | 4/2008 | Takemura et al. ............ | 327/108 |
| 7,375,555 B1 * | 5/2008 | Wang et al. ................... | 326/81 |

* cited by examiner

*Primary Examiner*—James H. Cho
*Assistant Examiner*—Christopher Lo
(74) *Attorney, Agent, or Firm*—WPAT, PC; Justin King

(57) ABSTRACT

The present invention discloses a tri-state I/O port. The tri-state I/O port comprises a tri-state logic block, a weak buffer and a delay block. The input terminals of the tri-state logic block are connected to data and OE (output enable) signals. When OE signal is enabled, the output terminal of the tri-state I/O block is pulled high when the data is high while the output terminal is pulled low when the data is low. The input terminal and the output terminal of the weak buffer are connected to the output terminal of the tri-state logic block. And the input terminal of the delay block is connected to the output terminal of the tri-state logic block while the output terminal of the delay block is fed back to the tri-state logic block. When the output terminal of the tri-state logic block is low to high/high to low, the weak buffer is active and maintains the output terminal of the tri-state logic block weak high/low while the delay block turns off the pull high/low function of the tri-state logic block.

18 Claims, 13 Drawing Sheets

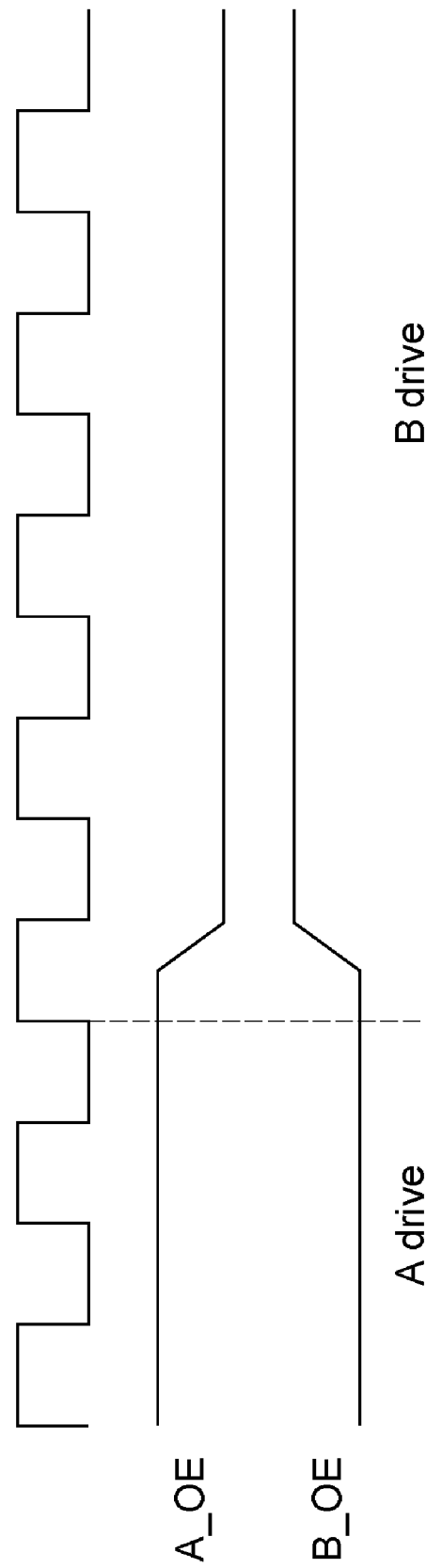

TRI-STATE I/O PORT

FIELD OF THE INVENTION

The present invention relates to a design of a tri-state I/O port, and more particularly to the design of a tri-state I/O port without a turn around time.

BACKGROUND OF THE INVENTION

Nowadays in the design of microprocessors and electronic systems, the protocol of data transmission regulates that when bus mastering switches, a turn around time is added in case of bus contention.

Refer to FIG. 1, which illustrates a turn around time which prevents bus contention. A and B represent A drive and B drive respectively wherein A drive and B drive both adopt tri-state I/O ports and share bus 10. A_OE and B_OE represent output enable signal of A drive and output enable signal of B drive respectively. During period 11, A_OE is high which represents that A drive is enabled and transmits data or commands through bus 10. And period 12 shows a turn around time which prevents bus contention when bus mastering of bus 10 switches from A drive to B drive. During period 12, A_OE is high then goes low which represents A drive turns to be disabled. Therefore, during period 13, B_OE is low then goes high which also represents that B drives turns to be enabled and acquires bus mastering of bus 10. Hence, B drive transmits data or commands through bus 10.

A turn around time is indeed needed to prevent bus contention when bus mastering of bus 10 switches under the present circuit structures of the tri-state I/O port adopted by A drive and B drive.

Refer to FIG. 2, which illustrates circuit diagrams of conventional tri-state I/O ports adopted by A drive and B drive. Data of A drive (A data) and output enable signal of A drive (A_OE) control ON/OFF of transistor 213 by a NAND component 210. Moreover, output enable signal of A drive (A_OE) which goes through a NOT component 212 first and data of A drive (A data) control ON/OFF of transistor 214 by a NOR component 211. A node Vo_A 215 which transistor 213 and transistor 214 are connected to outputs to bus 10 which A drive and B drive share. In addition, data of B drive (B data) and output enable signal of B drive (B_OE) control ON/OFF of transistor 219 by a NAND component 216. Moreover, output enable signal of B drive (B_OE) which goes through a NOT component 218 first and data of B drive (B data) control ON/OFF of transistor 220 by a NOR component 217. A node Vo_B 221 which transistor 219 and transistor 220 are connected to outputs to bus 10 which A drive and B drive share.

When output enable signal of A drive (hereinafter, A_OE) is low, the transistor 213 and the transistor 214 of A drive are both off, A drive is therefore disabled. When A_OE is high and data of A drive (hereinafter, A data) is high, the transistor 213 turns on so that the power voltage Vdd goes through the transistor 213 to Vo_A 215. Vo_A 215 is therefore high and a high level is inputted to the bus 10. On the contrary, When A_OE is high and A data is low, the transistor 214 turns on so that the ground voltage goes through the transistor 214 to Vo_A 215. Vo_A 215 is therefore low and a low level is inputted to the bus 10.

Moreover, when output enable signal of B drive (hereinafter, B_OE) is low, the transistor 219 and the transistor 220 of B drive are both off, B drive is therefore disabled. When B_OE is high and data of B drive (hereinafter, B data) is high, the transistor 219 turns on so that the power voltage Vdd goes through the transistor 219 to Vo_B 221. Vo_B 221 is therefore high and a high level is inputted to the bus 10. On the contrary, When B_OE is high and B data is low, the transistor 220 turns on so that the ground voltage goes through the transistor 220 to Vo_B 221. Vo_B 221 is therefore low and thus a low level is inputted to the bus 10.

The above description only demonstrates that A drive or B drive is enabled when their respective output enable signal (A_OE or B_OE) is high. However, a person skilled in the art may also make A drive or B drive is enabled when their respective output enable signal (A_OE or B_OE) is low. Furthermore, to enhance the pull-up and pull-down cabability of tri-state I/O ports adopted by A drive and B drive, a number of transistors may be put in parallel with transistor 213, transistor 214, transistor 219 or transistor 220.

If a turn around time is not defined by the protocol of data transmission, no effects would do to the tri-state I/O ports adopts by A drive and B drive when A drive and B drive are both enabled, and A data and B data are both high/low, However, when A drive and B drive are both enabled, and A data and B data are at different digital level, the tri-state I/O ports adopted by A drive or B drive may suffer from power dissipation or unstable system problem. Hereinafter, there will be described in detail.

If A drive and B drive are both enabled, and A data is high while B data is low, the transistor 213 and the transistor 220 thus both turn on. The current from the power source Vdd which goes through the transistor 213 and the transistor 220 to the ground will be very large because the transistor 213 and the transistor 220 have low impedances. The large current penetrates the transistor 213 and the transistor 220, therefore the transistor 213 and the transistor 220 are damaged which results in that the tri-state I/O port adopted by A drive or B drive suffers from power dissipation or unstable system problem. Or if A drive and B drive are both enabled, and A data is low while B data is high, the transistor 214 and the transistor 219 thus both turn on. The current from the power source Vdd which goes through the transistor 219 and the transistor 214 to the ground will be very large because the transistor 214 and the transistor 219 have low impedances. The large current penetrates the transistor 214 and the transistor 219, therefore the transistor 214 and the transistor 219 are damaged which results in that the tri-state I/O port adopted by A drive or B drive suffers from power dissipation or unstable system problem.

In view of prior art, a turn around time must be added when bus mastering switches to prevent from bus contention, extra power dissipation or unstable system problems, under the circuit structure of the tri-state I/O port mentioned above. However, adding a turn around time is a safe solution but also leads to a problem for decreasing the data transmission speed of system. Therefore, how to design a tri-state I/O port which transmits data more effectively and is not damaged when bus contention happens is the subject matter of the present invention.

SUMMARY OF THE INVENTION

It is an object of the present invention is to provide a design of a tri-state I/O port so that a turn around time in the prior art is not needed and it would not suffer from the problem of breaking down or power dissipation when bus contention happens.

In order to attain the foregoing object, a claimed invention provides a tri-state I/O port. The tri-state I/O port comprises a tri-state logic block, a weak buffer and a delay block. The input terminals of the tri-state logic block are connected to data and OE (output enable) signals. When OE signal is enabled, the output terminal of the tri-state I/O block is pulled high when the data is high while the output terminal is pulled low when the data is low. The input terminal and the output terminal of the weak buffer are connected to the output terminal of the tri-state logic block. And the input terminal of the delay block is connected to the output terminal of the tri-state logic block while the output terminal of the delay block is fed back to the tri-state logic block. When the output terminal of the tri-state logic block is low to high/high to low, the weak buffer is active and maintains the output terminal of the tri-state logic block weak high/low while the delay block turns off the pull high/low capability of the tri-state logic block.

BRIEF DESCRIPTION OF THE DRAWINGS

The above contents of the present invention will become more readily apparent to those ordinarily skilled in the art after reviewing the following detailed description and accompanying drawings, in which:

FIG. 7 is a diagram illustrating bus mastering switches from A drive to B drive without a turn around time.

DETAILED DESCRIPTION OF THE PREFERRED EMBODIMENT

Figure 2:
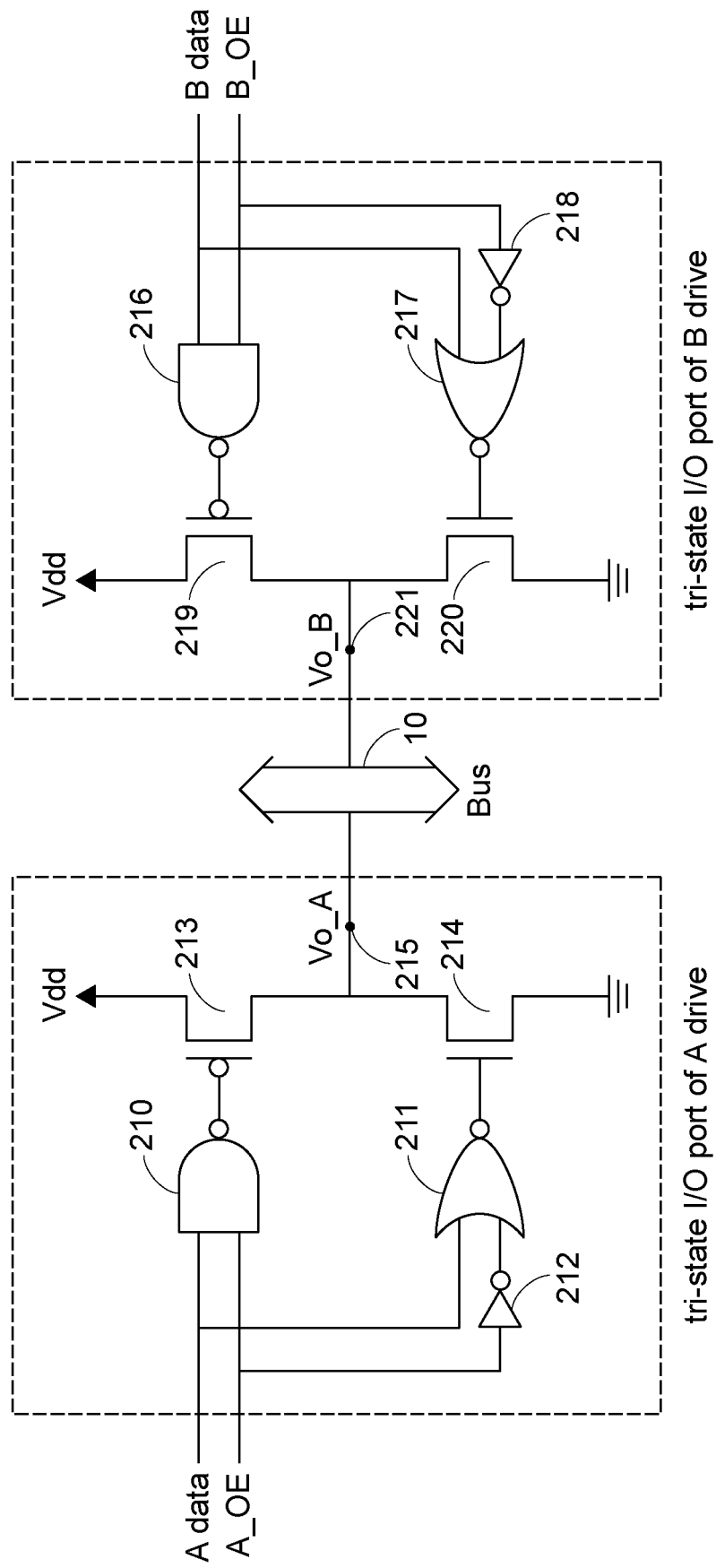
FIG. 2 is a diagram illustrating inner circuit of conventional tri-state I/O ports adopted by A drive and B drive.
Figure 3A:
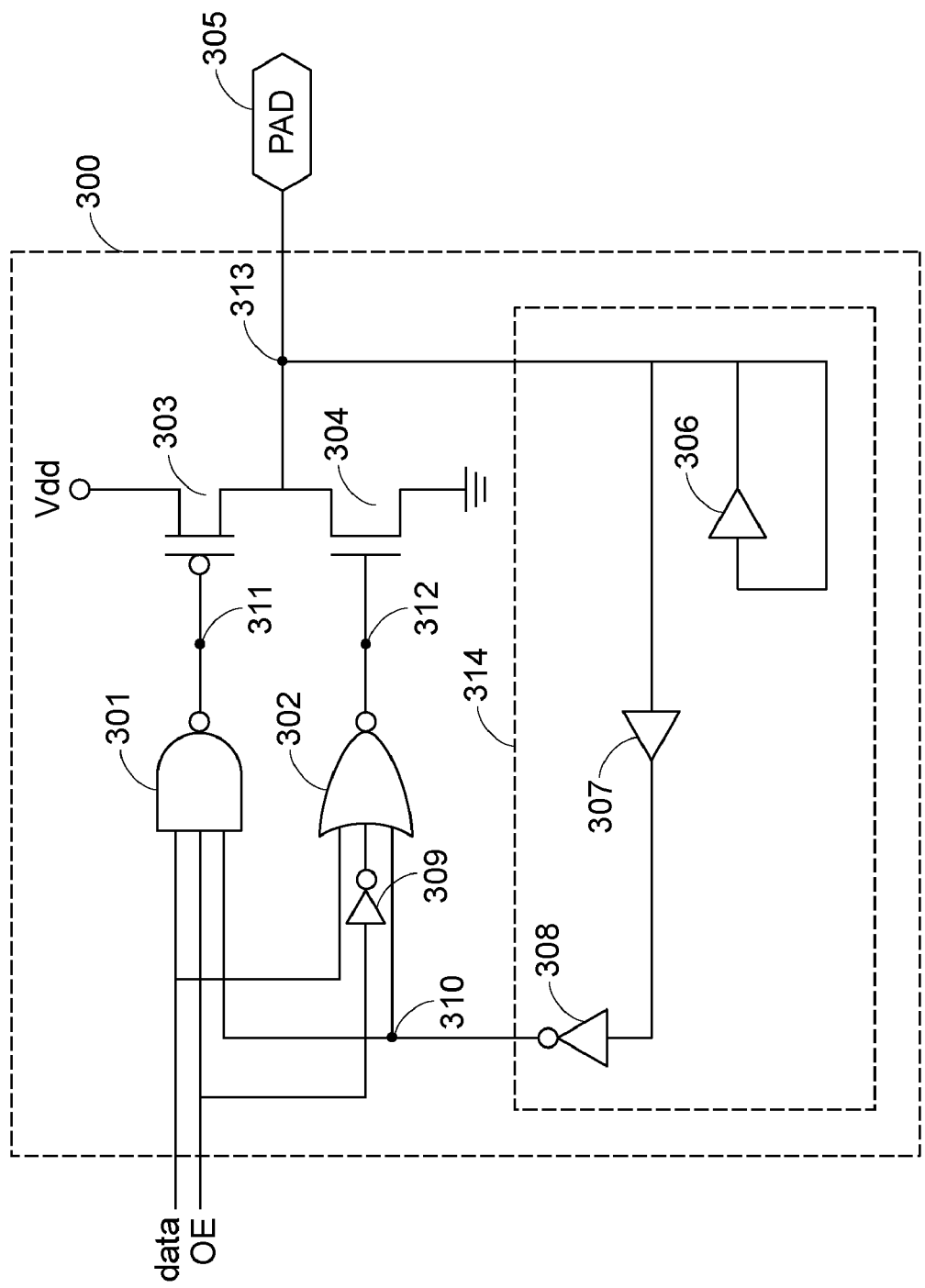
FIG. 3A is a diagram illustrating a tri-state I/O port according to a first embodiment of the present invention.

Refer to FIG. 3A, which illustrates a tri-state I/O port according to a first embodiment of the present invention. If a system regulates that a turn around time is not used when bus mastering switches according to the protocol of data transmission, the tri-state I/O ports as mentioned in prior art may suffer from power dissipation or unstable system problem. The tri-state I/O port which may operate without a turn around time in the first embodiment of the present invention not only increases the data transmission speed of the system but also prevents from breaking down. FIG. 3A illustrates the design of the tri-state I/O port 300. The input terminal of the tri-state I/O port 300 receive data and output enable signal (hereinafter, OE signal), while the output terminal (node 313) of the tri-state I/O port 300 is connected to a metallic pad (PAD) 305 which is connected to the bus shared with other drives. Wherein NAND component 301, NOR component 302, transistor 303, transistor 304 and NOT component 309 are similar to those in FIG. 2A, the description is thus omitted. In addition, the output node 313 is connected to a weak buffer 306 and the output of the weak buffer 306 is connected to the output node 313. Another path from the output node 313 goes through a delay 307 and an inverter 308, then connects to the NAND component 301 and the NOR component 302 respectively. Furthermore, the circuit block 314 detects variation of digital state of PAD 305, i.e. the output of the tri-state I/O port is high then goes low or is low then goes high. If there's variation of digital state of PAD 305, the circuit block 314 in FIG. 3A starts to operate. Hereinafter, there will be described in detail.

When the OE signal is high, the tri-state I/O port 300 is enabled. If the inputted data is from low to high, the output node 313 of the tri-state I/O port 300 is thus from low to high. PAD 305 is also from low to high detected by the circuit block 314. That is to say, when inputted data is low, the output node 313 of the tri-state I/O port 300 is also low wherein the low level is maintained by the weak buffer 306. Furthermore, the circuit block 314 controls the NOR component 302 outputting a low level which leads to the result of turning off the transistor 304. When the inputted data then goes high, the output of the tri-state I/O port 300 is pulled strong high first. In another word, when inputted data is from low to high, node 311 is from high to low by the operation of the NAND component 301. The output node 313 is thus pulled high because the transistor 303 has been turned on. PAD 305 is at a strong high level for the time being. The strong high level of the output node 313 then goes through the delay 307 and the inverter 308 wherein the node 310 goes low, then inputs to the NAND component 301 and NOR component 302 respectively. The node 311 is from low to high and thus the transistor 303 is turned off, i.e. the pulling high capability of the tri-state I/O port 300 is turned off. At the same time another path from the output node 313 goes through the weak buffer 306 and returns to the output node 313. The output node 313 is thus kept at a high level which is a weak high level maintained by the weak buffer 306.

Figure 3B:
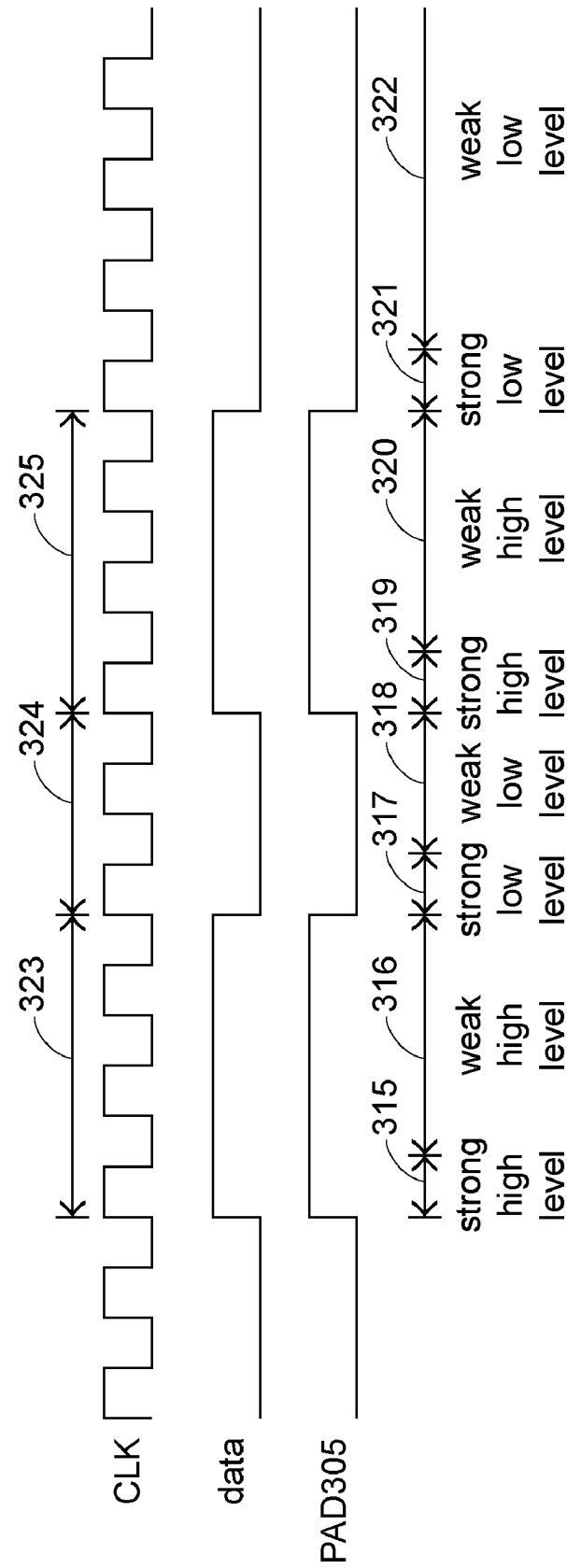
FIG. 3B is a diagram illustrating the waveform of the input terminal and output terminal of the tri-state I/O port according to the first embodiment of the present invention.

Therefore, when the output of the tri-state I/O port is from low to high, the pull strong high block (NAND 301 and transistor 303) operates in the first place, the output node 313 is low then goes strong high 315 as shown in FIG. 3B. After that, a delay block (delay 307 and inverter 308) operates, the pulling high capability of the tri-state I/O port 300 is thus turned off. The output node is then maintained at the weak high level 316 by the weak buffer 306 as shown in FIG. 3B. Consequently, when the output of PAD 305 is at a high level, mostly it's at a weak high level which is maintained by the weak buffer 306.

In the same way, if the inputted data is from high to low, the output node 313 of the tri-state I/O port 300 is thus from high to low. PAD 305 is also from high to low detected by the circuit block 314. That is to say, when inputted data is high, the output node 313 of the tri-state I/O port 300 is also high wherein the high level is maintained by the weak buffer 306. Furthermore, the circuit block 314 controls the NAND component 301 outputting a high level which leads to the result of turning off the transistor 303. When the inputted data goes low, the output of the tri-state I/O port 300 is pulled strong low first. In another word, when inputted data is from high to low, node 312 is from low to high by the operation of the NOR component 302. The output node 313 is thus pulled low because the transistor 304 has been turned on. PAD 305 is at a strong low level for the time being. The strong low level of the output node 313 then goes through the delay 307 and the inverter 308 wherein the node 310 goes high, then inputs to the NAND component 301 and NOR component 302 respectively. The node 312 is from high to low and thus the transistor 304 is turned off, i.e. the pulling low capability of the tri-state I/O port 300 is turned off. At the same time another path from the output node 313 goes through the weak buffer 306 and returns to the output node 313. The output node 313 is thus kept at a low level which is a weak low level maintained by the weak buffer 306.

Therefore, when the output of the tri-state I/O port is from high to low, the pull strong low block (inverter, NOR 302 and transistor 304) operates in the first place, the output node 313 is high then goes strong low 317 as shown in FIG. 3B. After that, a delay block (delay 307 and inverter 308) operates, the pulling low capability of the tri-state I/O port 300 is thus turned off. The output node 313 is then maintained at the weak low level 318 by the weak buffer 306 as shown in FIG. 3B. Consequently, when the output of PAD 305 is at a low level, mostly it's at a weak low level which is maintained by the weak buffer 306.

It is to be noted that the main function of the weak buffer 306 in the first embodiment of the present invention is to maintain the high level or the low level of the output node when the pulling high capability or the pulling low capability of the tri-state I/O port 300 is turned off. Moreover, even when the outputs of the tri-state I/O port 300 and other tri-state I/O port are at different digital state, they would not suffer from the large current which flows from the power source Vdd and goes through transistors to the ground as mentioned in the prior art because the weak buffer 306 has a high impedance. In another word, when outputs of the tri-state I/O port 300 and the other tri-state I/O port are at different digital state and bus mastering switches from the tri-state I/O port 300 to the other tri-state I/O port, they would not break down because mostly the output of these tri-state I/O port are at a weak high level or at a weak low level. A turn around time in the prior art is thus not needed and the design of the tri-state I/O port mentioned above not only increases the data transmission speed of the system but also effectively prevents from extra power dissipation or unstable system problems when bus matering switches.

In addition, the output of the tri-state I/O port 300 are mostly at a weak high level or a weak low level which is maintained by the weak buffer 306. Hence, if the input of the tri-state I/O port 300 transfers to another digital state, the pull strong high block or the pull strong low block operates right away whereby the output is pulled high or pulled low immediately.

Figure 3C:
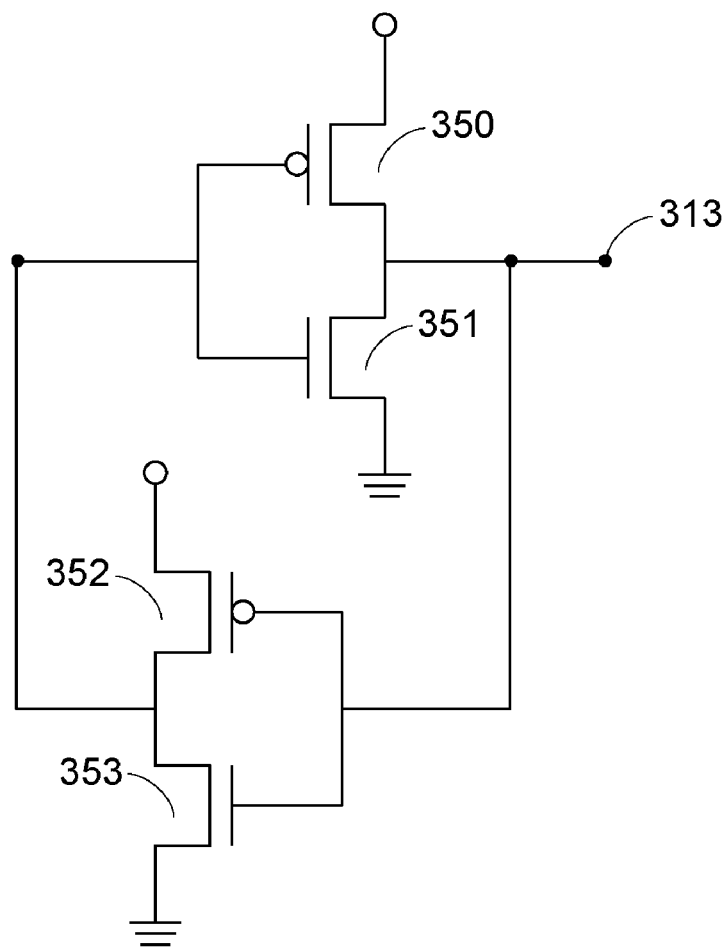
FIG. 3C is a diagram illustrating the inner structure of the weak buffer according to the first embodiment of the present invention.
Figure 3D:
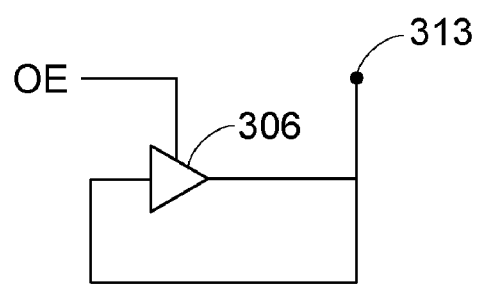
FIG. 3D is a diagram illustrating the weak buffer with an OE signal inputted according to the first embodiment of the present invention.

To fulfill the function of the weak buffer 306, the inner structure of the weak buffer 306 may be implemented in many ways. For example, two inventors are put in series as shown in FIG. 3C. The inverter composed of the transistor 352 and the transistor 353 is a weak inverter wherein the transistor 352 is a weak P-MOSFET while the transistor 353 is a weak N-MOSFET. The pulling high speed and the pulling low speed are slower because the weak P-MOSFET and the weak N-MOSFET are long-channel devices. Hence, if PAD 305 transfers to another digital state, the high/low level of PAD 305 is then maintained by the weak buffer 306. Because the weak buffer 306 adopts long channel devices, its pulling high/low speed is slower and it cooperates with the delay block which turns off the operation of the pull strong high/low block of the tri-state I/O port 300 just right. Furthermore, the weak buffer 306 may also has a tri-state function as shown in FIG. 3D, i.e. the weak buffer 306 is enabled according to the OE signal of the tri-state I/O port to fulfill the virtue of power saving.

Besides, the delay 307 is composed of one buffer or a number of buffers in series to accomplish the delay time according to the requirement of the system. Or a threshold voltage of a transistor is designed so that when the transistor is turned on, the pull strong high/low block of the tri-state I/O port is turned off. Please refer to FIG. 3B, During period 323, 324 and 325, the time duration of the strong high level (period 315 and 319) and the time duration of the strong low level (period 317, 321) may be determined by designing the delay time of the delay 307 or the threshold voltage of transistor of the delay 307.

Figure 4A:
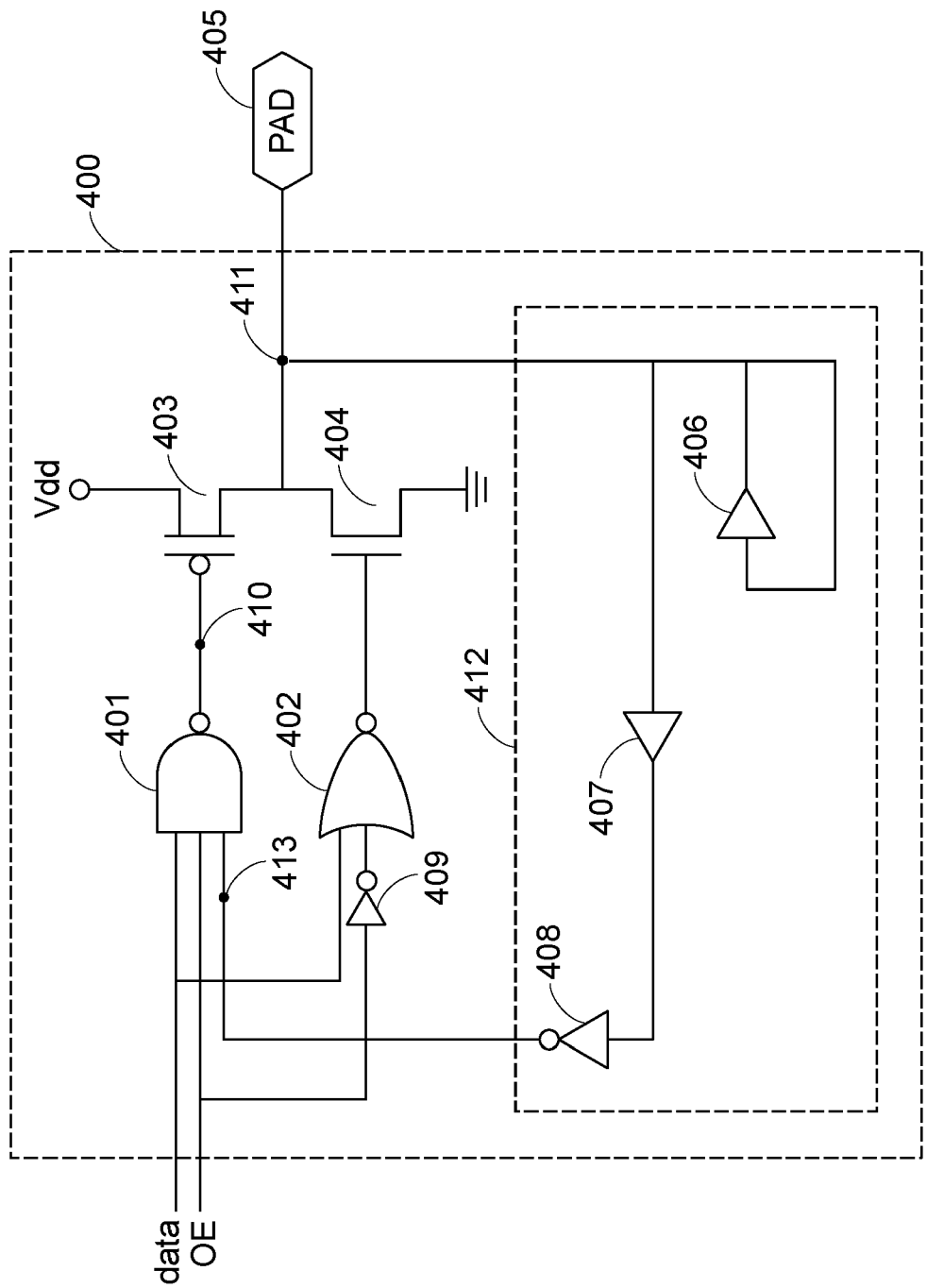
FIG. 4A is a diagram illustrating a tri-state I/O port according to a second embodiment of the present invention.

Refer to FIG. 4A, which illustrates a tri-state I/O port according to a second embodiment of the present invention. If a system, command lines of PCI bus or LPC (low pin count bus) for example, regulates that the output of an enabled tri-state I/O pot should be pulled high when bus mastering switches from the enabled tri-state I/O port to the other tri-state I/O port according to the protocol of data transmission, the tri-state I/O ports as mentioned in prior art may suffer from power dissipation or unstable system problem. The tri-state I/O port which may operate without a turn around time in the second embodiment of the present invention not only increases the data transmission speed of the system but also prevents from breaking down. FIG. 4A illustrates the design of the tri-state I/O port 400. The input terminal of the tri-state I/O port 400 receives data and output enable signal (hereinafter, OE signal), while the output terminal (node 411) of the tri-state I/O port 400 is connected to a metallic pad (PAD) 405 which is connected to the bus shared with other drives. Wherein NAND component 401, NOR component 402, transistor 403, transistor 404 and NOT component 409 are similar to those in FIG. 2A, the description is thus omitted. In addition, output node 411 are connected to a weak high buffer 406 and the output of the weak high buffer 406 are connected to the output node 411. Another path from the output node 411 goes through a delay 407 and an inverter 408, then connects to NAND component 401. Furthermore, the circuit block 412 detects whether PAD 405 is from low to high, i.e. the output of the tri-state I/O port is from low to high. If PAD 405 is from low to high, the circuit block 412 in FIG. 4A starts to operate. Hereinafter, there will be described in detail.

When the OE signal is high, the tri-state I/O port 400 is enabled. If the inputted data is from low to high, the output node 411 of the tri-state I/O port 400 is thus from low to high. PAD 405 is also from low to high detected by the circuit block 412. That is to say, when inputted data is low, the output node 411 of the tri-state I/O port 400 is also low wherein the low level is maintained by the pull strong low block (inverter 409, NOR 402 and transistor 404). Therefore, when inputted data transfers to a high level, the output is pulled high by the tri-state I/O port 400 first. In another word, when inputted data is from low to high, node 410 is from high to low by the operation of the NAND component 401. The output node 411 is thus pulled high because the transistor 403 has been turned on. PAD 405 is at a strong high level for the time being. The strong high level of the output node 411 then goes through the delay 407 and the inverter 408 wherein the node 413 goes low, then inputs to the NAND component 401. The node 410 is from low to high and thus the transistor 403 is turned off, i.e. the pulling high capability of the tri-state I/O port 400 is turned off. At the same time another path from the output node 411 goes through the weak high buffer 406 and returns to the output node 411. The output node 411 is thus kept at a high level which is a weak high level maintained by the weak high buffer 406.

Figure 4B:
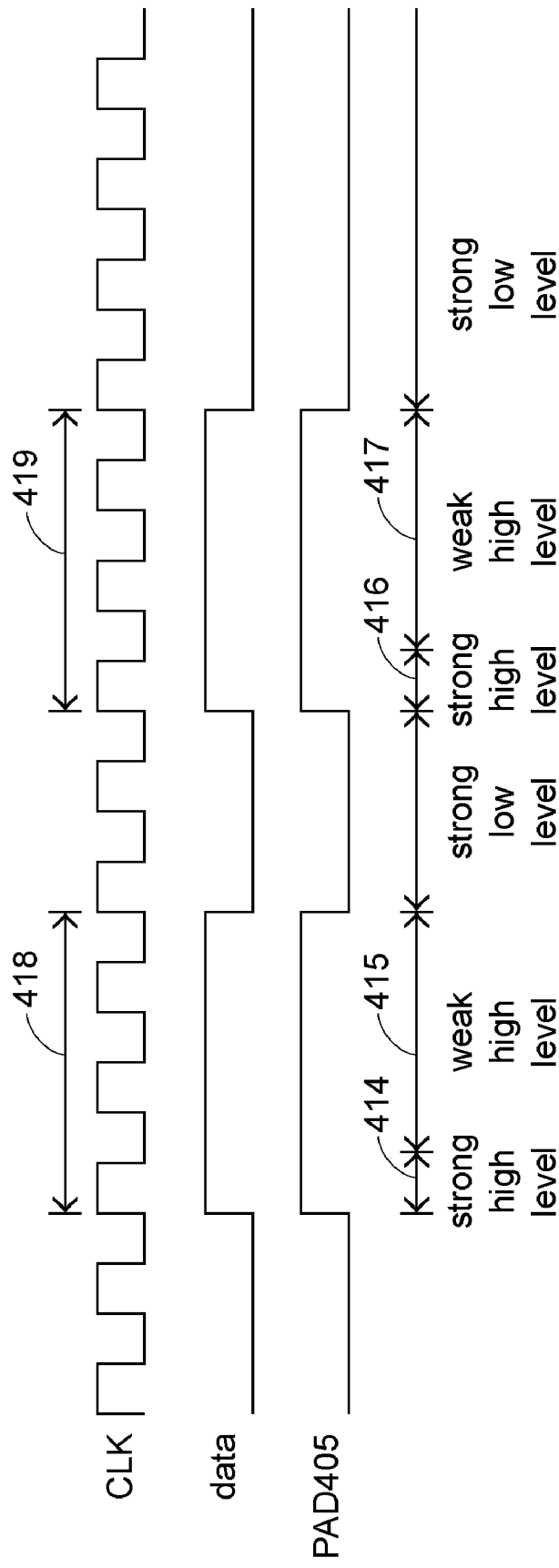
FIG. 4B is a diagram illustrating the waveform of the input terminal and output terminal of the tri-state I/O port according to the second embodiment of the present invention.

Therefore, when the output of the tri-state I/O port is from low to high, the pull strong high block (NAND 401 and transistor 403) operates in the first place, the output node 411 is low then goes strong high 414 as shown in FIG. 4B. After that, a delay block (delay 407 and inverter 408) operates, the pulling high capability of the tri-state I/O port 400 is thus turned off. The output node is then maintained at the weak high level 415 by the weak high buffer 406 as shown in FIG. 4B. Consequently, when the output of PAD 405 is at a high level, mostly it's at a weak high level which is maintained by the weak high buffer 406.

It is to be noted that the main function of the weak high buffer in the second embodiment of the present invention is to maintain the high level of the output node when the pulling high capability of the tri-state I/O port 400 is turned off. Moreover, even when the outputs of the tri-state I/O port 400 and other tri-state I/O port are at different digital state, they would not suffer from the large current which flows from the power source Vdd and goes through transistors to the ground as mentioned in the prior art because the weak high buffer 406 has a high impedance. In another word, when outputs of the tri-state I/O port 400 and the other tri-state I/O port are at different digital state and bus mastering switches from the tri-state I/O port 400 to the other tri-state I/O port, they would not break down because mostly the outputs of these tri-state I/O port are at a weak high level. A turn around time in the prior art is thus not needed and the design of the tri-state I/O port 400 not only increases the data transmission speed of the system but also effectively prevents from extra power dissipation or unstable system problems when bus matering switches.

In addition, the high level of the output node 411 maintained by the weak high buffer 406 is a weak high level. Hence, if the input of the tri-state I/O port 400 transfers from high to low, the pull strong low block (inverter 409, NOR 402 and transistor 404) operates right away whereby the output is pulled low immediately.

Figure 4C:
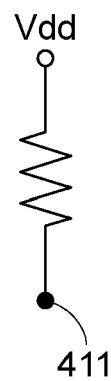
FIG. 4C is a diagram illustrating a weak high buffer which is replaced with a resistor according to the second embodiment of the present invention.
Figure 4D:
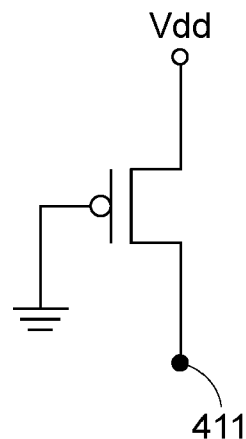
FIG. 4D is a diagram illustrating a weak high buffer which is replaced with a P-MOSFET according to the second embodiment of the present invention.
Figure 4E:
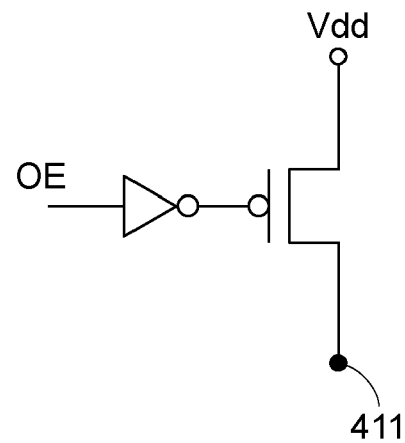
FIG. 4E is a diagram illustrating a weak high buffer which is replaced with a P-MOSFET according to the second embodiment of the present invention.

To fulfill the function of the weak high buffer 406, the inner structure of the weak high buffer 406 may be implemented in many ways. For example, two inventors are put in series as shown in FIG. 3C. The inverter composed of the transistor 352 and the transistor 353 is a weak inverter wherein the transistor 352 is a weak P-MOSFET and the transistor 353 is a weak N-MOSFET while the inverter composed of the transistor 305 and the transistor 351 is a general inventor. The pulling high speed is slower because the weak P-MOSFET and the weak N-MOSFET are long-channel devices. Hence, if PAD 405 transfers from low to high, the high level of PAD 405 is then maintained by the weak high buffer 406. Because the weak high buffer 406 adopts long channel devices, its pulling high speed is slower and it may cooperate with the delay block which turns off the operation of the pull strong high block of the tri-state I/O port 400 just right. Furthermore, the weak high buffer 406 may also has a tri-state function as shown in FIG. 3D, i.e. the weak buffer 406 is enabled according to the OE signal of the tri-state I/O port 400 to fulfill the virtue of power saving. In addition, to cost down and fulfill the pulling weak high function, the weak high buffer 406 may be implemented with a high impedance resistor which is connected between the power source Vdd and the output node 411 as shown in FIG. 4C. The weak high buffer 406 may also be implemented with a weak P-MOSFET which is connected between the power source Vdd and the output node 411 as shown in FIG. 4D. Moreover, the weak high buffer 406 may be implemented with a weak P-MOSFET wherein OE signal is connected to the gate of the weak P-MOSFET through an inverter, the power source Vdd is connected to the source of the weak P-MOSFET and the output node 411 is connected to the drain of the weak P-MOSFET as shown in FIG. 4E. Therefore the pulling weak high function of the weak P-MOSFET is enabled by the OE signal.

Besides, the delay 407 is composed of one buffer or a number of buffers in series to accomplish the delay time according to the requirement of the system. Or a threshold voltage of a transistor is designed so that when the transistor is turned on, the pull strong high block of the tri-state I/O port is turned off. Please refer to FIG. 4B, during period 418 and 419, the time duration of the strong high level (period 414 and 416) may be determined by designing the delay time of the delay 407 or the threshold voltage of transistor of the delay 407.

Figure 5A:
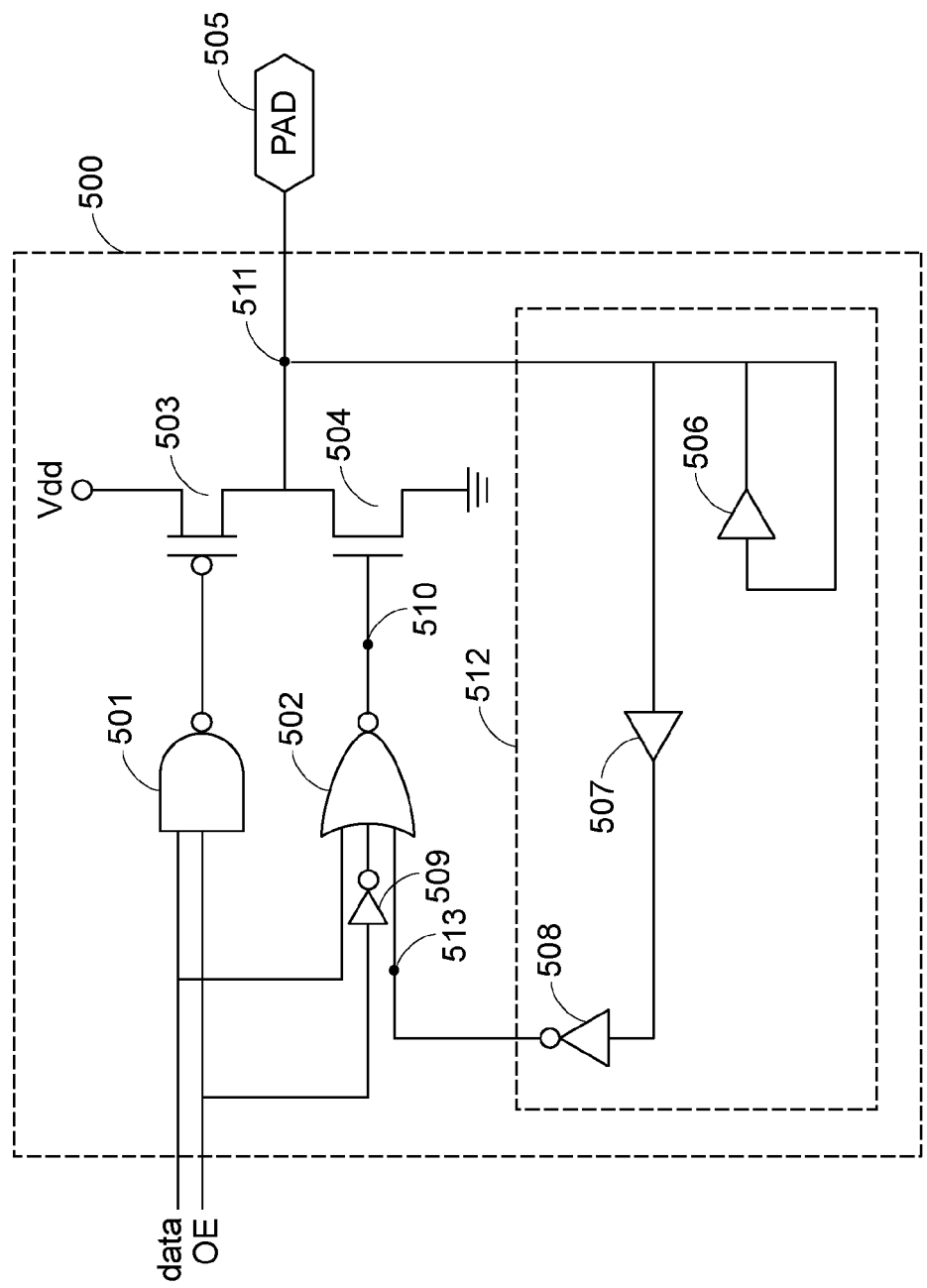
FIG. 5A is a diagram illustrating a tri-state I/O port according to a third embodiment of the present invention.

Refer to FIG. 5A, which illustrates a tri-state I/O port according to a third embodiment of the present invention. If a system regulates that the output of an enabled tri-state I/O pot should be pulled low when bus mastering switches from the enabled tri-state I/O port to the other tri-state I/O port according to the protocol of data transmission, the tri-state I/O ports as mentioned in prior art may suffer from power dissipation or unstable system problem. The tri-state I/O port which may operate without a turn around time in the third embodiment of the present invention not only increases the data transmission speed of the system but also prevents from breaking down. FIG. 5A illustrates the design of the tri-state I/O port 500. The input terminal of the tri-state I/O port 500 receives data and output enable signal (hereinafter, OE signal), while the output terminal (node 511) of the tri-state I/O port 500 is connected to a metallic pad (PAD) 505 which is connected to the bus shared with other drives. Wherein NAND component 501, NOR component 502, transistor 503, transistor 504 and NOT component 509 are similar to those in FIG. 2A, the description is thus omitted. In addition, output node 511 is connected to a weak low buffer 506 and the output of the weak high buffer 506 is connected to the output node 411. Another path from the output node 511 goes through a delay 507 and an inverter 508, then connects to NOR component 502. Furthermore, the circuit block 512 detects whether PAD 505 is from high to low, i.e. the output of the tri-state I/O port is from high to low. If PAD 505 is from high to low, the circuit block 512 in FIG. 5A starts to operate. Hereinafter, there will be described in detail.

When the OE signal is high, the tri-state I/O port 500 is enabled. If the inputted data is from high to low, the output node 511 of the tri-state I/O port 500 is thus from high to low. PAD 505 is also from high to low detected by the circuit block

512. That is to say, when inputted data is high, the output node 511 of the tri-state I/O port 500 is also high wherein the high level is maintained by the pull strong high block (NAND 501 and transistor 503). Therefore, when inputted data transfers to a low level, the output is pulled low by the tri-state I/O port 500 first. In another word, when inputted data is from high to low, node 510 is from low to high by the operation of the NOR component 502. The output node 511 is thus pulled low because the transistor 504 has been turned on. PAD 405 is at a strong low level for the time being. The strong high level of the output node 511 then goes through the delay 507 and the inverter 508 wherein the node 513 goes high, then inputs to the NOR component 502. The node 510 is from high to low and thus the transistor 504 is turned off, i.e. the pulling low capability of the tri-state I/O port 500 is turned off. At the same time another path from the output node 511 goes through the weak low buffer 506 and returns to the output node 511. The output node 511 is thus kept at a low level which is a weak low level maintained by the weak low buffer 506.

Figure 5B:
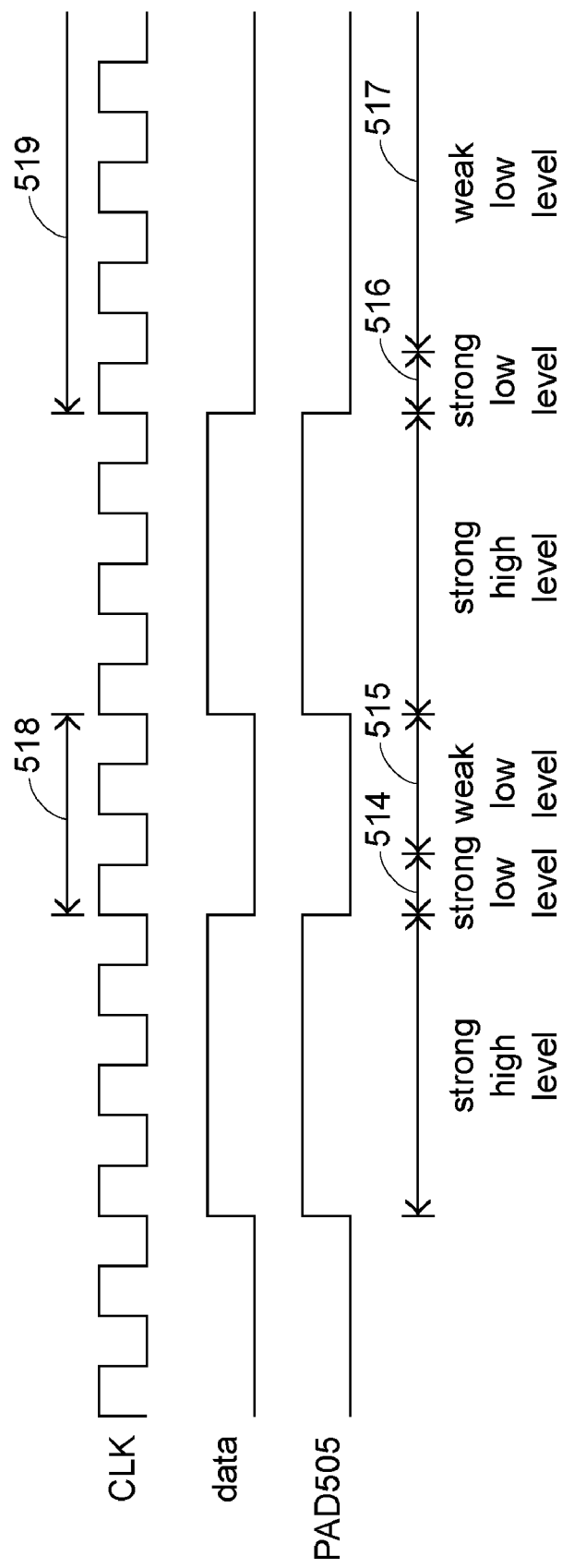
FIG. 5B is a diagram illustrating the waveform of the input terminal and output terminal of the tri-state I/O port according to the third embodiment of the present invention.

Therefore, when the output of the tri-state I/O port is from high to low, the pull strong low block (inverter 509, NOR 502 and transistor 504) operates in the first place, the output node 511 is high then goes strong low 514 as shown in FIG. 5B. After that, a delay block (delay 507 and inverter 408) operates, the pulling low capability of the tri-state I/O port 500 is thus turned off. The output node 511 is then maintained at the weak low level 515 by the weak low buffer 506 as shown in FIG. 5B. Consequently, when the output of PAD 505 is at a low level, mostly it's at a weak low level maintained by the weak high buffer 506.

It is to be noted that the main function of the weak low buffer 506 in the third embodiment of the present invention is to maintain the low level of the output node when the pulling low capability of the tri-state I/O port 500 is turned off. Moreover, even when the outputs of the tri-state I/O port 500 and other tri-state I/O port are at different digital state, they would not suffer from the large current which flows from the power source Vdd and goes through transistors to the ground as mentioned in the prior art because the weak low buffer 506 has a high impedance. In another word, when outputs of the tri-state I/O port 500 and the other tri-state I/O port are at different digital state and bus mastering switches from the tri-state I/O port 500 to the other tri-state I/O port, they would not break down because mostly the outputs of these tri-state I/O port are at a weak low level. A turn around time in the prior art is thus not needed and the design of the tri-state I/O port 500 not only increases the data transmission speed of the system but also effectively prevents from extra power dissipation or unstable system problems when bus matering switches.

In addition, the low level of the output node 511 maintained by the weak low buffer 506 is a weak low level. Hence, if the input of the tri-state I/O port 500 transfers from low to high, the pull strong high block (NAND 502 and transistor 503) operates right away whereby the output is pulled high immediately.

Figure 5C:
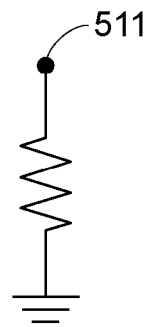
FIG. 5C is a diagram illustrating a weak low buffer which is replaced with a resistor according to the third embodiment of the present invention.
Figure 5D:
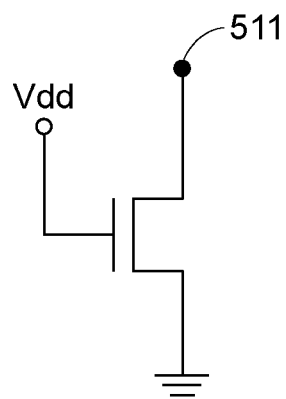
FIG. 5D is a diagram illustrating a weak low buffer which is replaced with a N-MOSFET according to the third embodiment of the present invention.
Figure 5E:
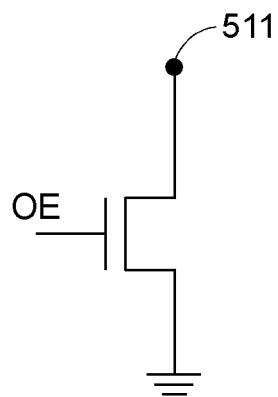
FIG. 5E is a diagram illustrating a weak low buffer which is replaced with a N-MOSFET according to the third embodiment of the present invention.

To fulfill the function of the weak low buffer 506, the inner structure of the weak high buffer 506 may be implemented in many ways. For example, two inventors are put in series as shown in FIG. 3C. The inverter composed of the transistor 352 and the transistor 353 is a weak inverter wherein the transistor 352 is a weak P-MOSFET and the transistor 353 is a weak N-MOSFET. The pulling low speed is slower because the weak P-MOSFET and the weak N-MOSFET are long-channel devices. Hence, if PAD 505 transfers from high to low, the low level of PAD 505 is then maintained by the weak low buffer 506. Because the weak low buffer 506 adopts long channel devices, its pulling low speed is slower and it may cooperate with the feedback of the delay block and the inverter 508 which turns off the operation of the pull strong low block of the tri-state I/O port 500 just right. Furthermore, the weak low buffer 506 may also has a tri-state function as shown in FIG. 3D, i.e. the weak low buffer 506 is enabled according to the OE signal of the tri-state I/O port 500 to fulfill the virtue of power saving. In addition, to cost down and fulfill the pulling weak high function, the weak low buffer 406 may be implemented with a high impedance resistor which is connected between the ground and the output node 511 as shown in FIG. 5C. The weak low buffer 506 may also be implemented with a weak N-MOSFET which is connected between the ground and the output node 511 as shown in FIG. 5D. Moreover, the weak low buffer 506 may be implemented with a weak N-MOSFET wherein OE signal is connected to the gate of the weak N-MOSFET, the ground is connected to the source of the weak N-MOSFET and the output node 511 is connected to the drain of the weak N-MOSFET as shown in FIG. 5E. Therefore the pulling weak low function of the weak N-MOSFET is controlled by the OE signal.

Besides, the delay 507 is composed of one buffer or a number of buffers in series to accomplish the delay time according to the requirement of the system. Or a threshold voltage of a transistor is designed so that when the transistor is turned on, the pull strong low block of the tri-state I/O port is turned off. Please refer to FIG. 5B, during period 518 and 519, the time duration of the strong low level (period 514 and 516) may be determined by designing the delay time of the delay 507 or the threshold voltage of transistor of the delay 507.

In conclusion, the tri-state I/O port according to the present invention are mainly composed of a pull strong high block, a pull strong low block, a weak buffer and a delay block. Under the above structure, the output terminal of the tri-state I/O port is mostly at a weak high/low level which effectively prevents from breaking down when bus contention happens. However, a weak buffer directly connected to the bus may also accomplish the same effect for preventing from breaking down when bus contention happens as the tri-state I/O port mentioned above does.

Figure 6:
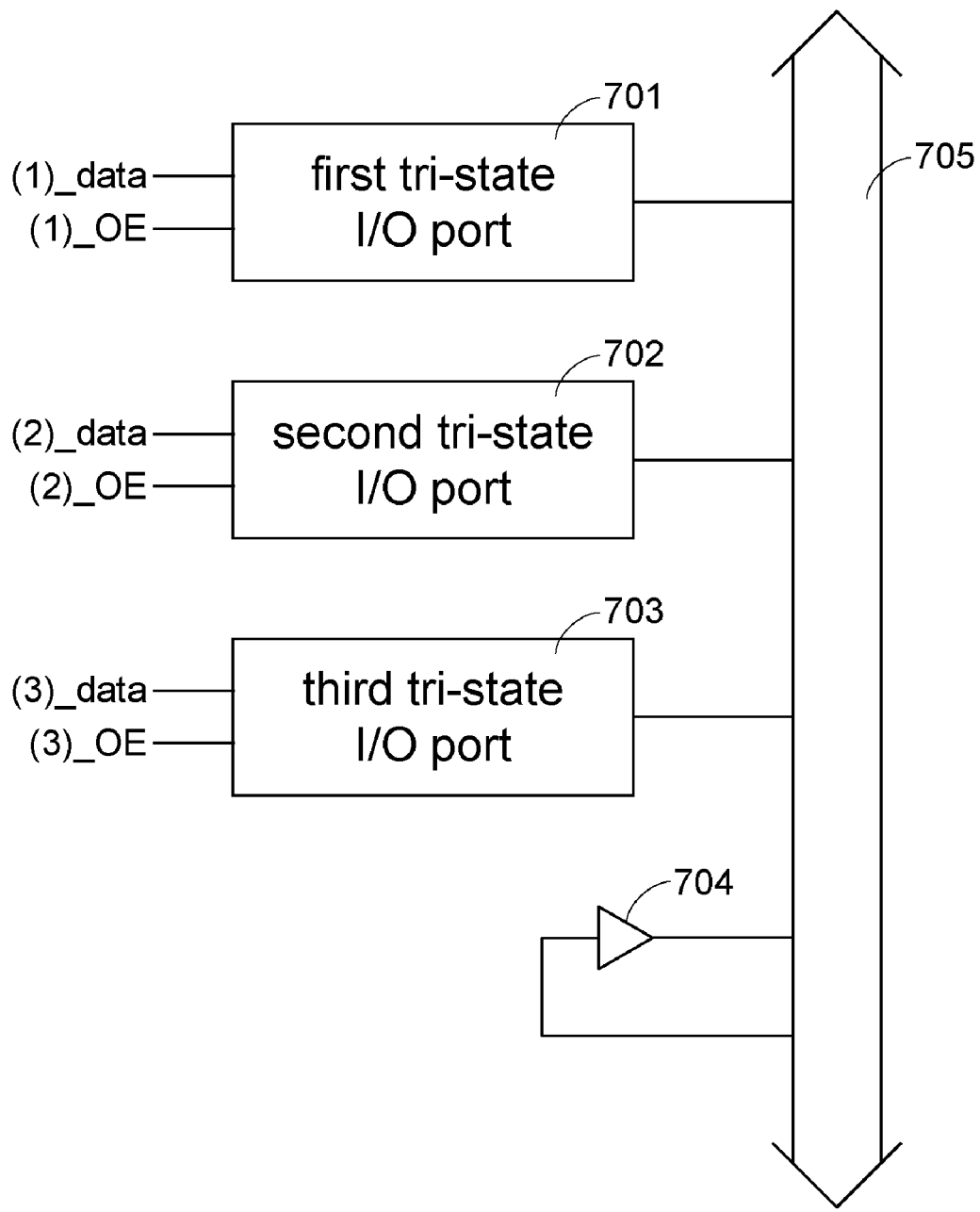
FIG. 6 is a diagram illustrating a number of tri-state I/O ports share a weak buffer.

Refer to FIG. 6, which illustrates a number of tri-state I/O ports sharing a weak buffer. The first tri-state I/O port 701, the second tri-state I/O port 702 and the third tri-state I/O port 703 all comprises a pull strong high block, a pull strong low block, a delay block. The pull strong high block, the pull strong low block and the delay block in the present embodiment are similar to those in the above embodiments, the description is thus omitted. A bus 705 is shared by the three tri-state I/O ports, the outputs of the three tri-state I/O ports are hence connected to the bus 705. Moreover, the bus 705 is connected to a weak buffer 704 and the output of the weak buffer 704 is connected to the bus. When the output of the bus 705 is from high to low or is from low to high, the output of the bus 705 is kept at a weak high/low level because of the operation of the weak buffer 704 and the pulling high/low capability of these tri-state I/O ports are turned off. (The pulling high/low capability of the enabled tri-state I/O port is turned off because the operation of the delay block, while the pulling high/low capability of the disabled tri-state I/O ports are disabled.) In addition, because the weak buffer 704 has a high impedance, the output of the shared bus 705 is mostly kept at a weak high/low level. Thus when bus mastering switches and the output of the shared bus 705 transfers to a different digital state, the tri-state I/O ports which share the bus 705 would not suffer from the large current which flows from the power source Vdd and goes through transistors to the ground as mentioned in the prior art. In another word, the tri-state I/O ports which share the bus 705 would not break down or suffer from the problem of power dissipation or unstable system. Therefore, the design of the tri-state I/O port is simplified and the cost of circuits is saved, too. A turn around time in the prior art is thus not needed and the design of the tri-state I/O ports in the present embodiment not only increases the data transmission speed of the system but also effectively prevents from extra power dissipation or unstable system problems when bus matering switches.

Besides, if a system regulates that the output of shared bus 705 should be pulled high when bus mastering switches, the weak buffer 704 may be replaced with the resistor in FIG. 4C or the weak P-MOSFET in FIG. 4D. On the contrary, if a system regulates that the output of shared bus 705 should be pulled low when bus mastering switches, the weak buffer 704 may be replaced with the resistor in FIG. 5C or the weak N-MOSFET in FIG. 5D.

Thus, the virtue of the present invention is adopting different design for tri-state I/O port which not only increases the data transmission speed of the system (a turn around time in the prior art is not needed) but also effectively prevents from breaking down. The output of the tri-state is mostly kept at a weak high/low level by the weak buffer. Hence, if the input of the tri-state I/O port 300 transfers to another digital state, the pull strong high/low block operates right away whereby the output is pulled high/low immediately. Moreover, the pulling strong high/low capability of the tri-state I/O port is turned off when the weak buffer operates. Thus the tri-state I/O port would not break down even when bus mastering switches and the output of the another tri-state I/O port is at different digital state.

Figure 1:
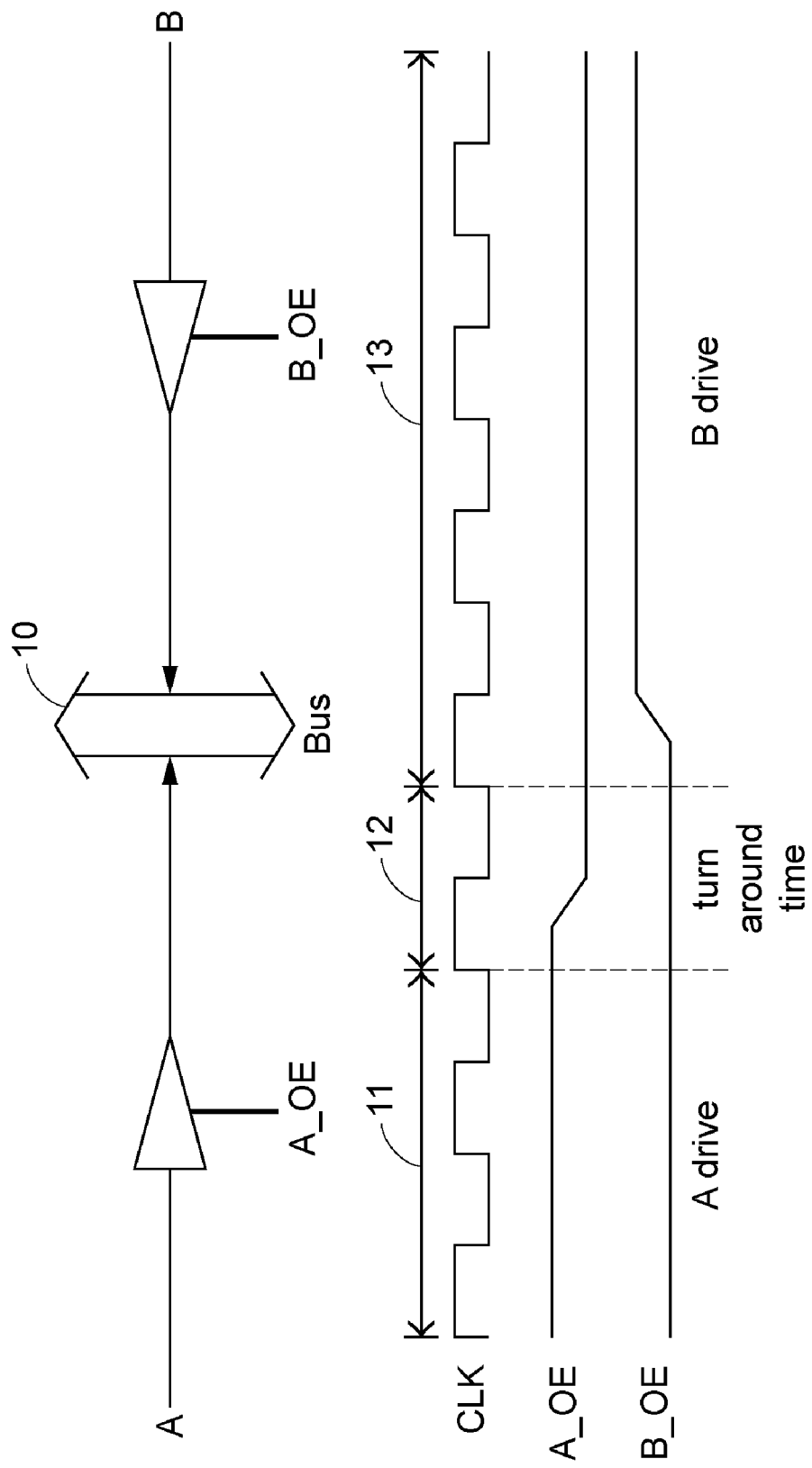
FIG. 1 is a diagram illustrating a turn around time which prevents bus contention.

Refer to FIG. 7, which illustrates tri-state I/O ports without a turn around time according to the present invention. In comparison with FIG. 1, B drive is enabled right after A drive is disabled when bus mastering switches from A drive to B drive. A turn around time is not used and the data transmission speed of the system is therefore improved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A tri-state I/O port comprising:
    a tri-state logical block having a data input terminal, an enable input terminal, and an output terminal wherein the data input terminal receives a data and the enable input terminal receives an enable signal and when the enable signal is enabled, the output terminal of the tri-state logical block is pulled high when the data is high while the output terminal of the tri-state logical block is pulled low when the data is low, wherein the tri-state logical block comprises a pull strong high block which is connected to the data input terminal, the enable input terminal, and the output terminal of the tri-state logical block; and a pull strong low block which is connected to the data input terminal, the enable input terminal, the output terminal of the delay block and the output terminal of the tri-state logical block;
    a weak buffer having an input terminal and an output terminal, wherein the input terminal and the output terminal of the weak buffer are directly connected to the output terminal of the tri-state logical block and the output terminal of the tri-state logical block is kept at a weak high level by the weak buffer when the output terminal of the tri-state logical block is from low to high while the output terminal of the tri-state logical block is kept at a weak low level by the weak buffer when the output terminal of the tri-state logical block is from high to low; and
    a delay block having an input terminal and an output terminal, wherein the input terminal of the delay block is connected to the output terminal of the tri-state logical block and the output terminal of the delay block is fed back to the tri-state logical block;
    wherein, the pull strong high block comprises a NAND component including an output terminal and a first input terminal connected to the data input terminal and a second input terminal connected to the enable input terminal, and a first transistor having a gate connected to the output terminal of the NAND component, a source connected to a power source, and a drain connected to the output terminal of the tri-state logical block; and the pull strong high block/pull strong low block is turned off when the output terminal of the tri-state logical block is kept at a weak high/low level by the weak buffer.

2. The tri-state I/O port according to claim 1 wherein the NAND component further comprises a third input terminals connected to the output terminal of the delay block.

3. The tri-state I/O port according to claim 1 wherein the pull strong low block comprises:
    a NOT component having an input terminal and an output terminal wherein the input terminal of the NOT component is connected to the enable input terminal;
    a NOR component having three input terminals and an output terminal wherein the input terminals are respectively connected to the data input terminal, the output terminal of the NOT component and the output terminal of the delay block; and
    a second transistor having a gate, a source, and a drain wherein the gate is connected to the output terminal of the NOR component, the source is connected to a ground, and the drain is connected to the output terminal of the tri-state logical block.

4. The tri-state I/O port according to claim 1 wherein the weak buffer is composed of two inverters which are in series connection.

5. The tri-state I/O port according to claim 4 wherein the weak buffer is composed of an inverter and a weak inverter in series connection.

6. The tri-state I/O port according to claim 1 wherein the weak buffer further connects to the enable input terminal for receiving the enable signal of the tri-state logical block inputted, the weak buffer only operates when the enable signal of the tri-state logical block is enabled.

7. The tri-state I/O port according to claim 1 wherein the delay block further comprises a delay and an inverter.

8. The tri-state I/O port according to claim 7 wherein the delay block is composed of a number of buffers in series connection.

9. The tri-state I/O port according to claim 7 wherein the delay time of the delay block is determined by the threshold voltage of a transistor.

10. A tri-state I/O port comprising:
    a tri-state logical block having a data input terminal, an enable input terminal, and an output terminal wherein the data input terminal receives a data and the enable input terminal receives an enable signal and when the enable signal is enabled, the output terminal of the tri-state logical block is pulled high when the data is high while the output terminal of the tri-state logical block is pulled low when the data is low, wherein the tri-state logical block comprises a pull strong high block which is connected to the data input terminal, the enable input terminal, the output terminal of the delay block and the output terminal of the tri-state logical block; and a pull strong low block which is connected to the data input terminal, the enable input terminal, and the output terminal of the tri-state logical block;

a weak buffer having an input terminal and an output terminal, wherein the input terminal and the output terminal of the weak buffer are directly connected to the output terminal of the tri-state logical block and the output terminal of the tri-state logical block is kept at a weak high level by the weak buffer when the output terminal of the tri-state logical block is from low to high while the output terminal of the tri-state logical block is kept at a weak low level by the weak buffer when the output terminal of the tri-state logical block is from high to low; and a delay block having an input terminal and an output terminal, wherein the input terminal of the delay block is connected to the output terminal of the tri-state logical block and the output terminal of the delay block is fed back to the tri-state logical block;

wherein, the pull strong low block comprises a NOT component having an output terminal and an input terminal connected to the enable input terminal, a NOR component including an output terminal and a first input terminal connected to the data input terminal and a second input terminal connected to the output terminal of the NOT component, and a first transistor having a gate connected to the output terminal of the NOR component and a source connected to a ground and a drain connected to the output terminal of the tri-state logical block; and the pull strong high block/pull strong low block is turned off when the output terminal of the tri-state logical block is kept at a weak high/low level by the weak buffer.

11. The tri-state I/O port according to claim 10 wherein the NOR component includes a third input terminal connected to the output terminal of the delay block.

12. The tri-state I/O port according to claim 10 wherein the pull strong high block comprises:
 a NAND component having three input terminals and an output terminal wherein the input terminals are respectively connected to the data input terminal, the enable input terminal and the output terminal of the delay block; and
 a second transistor having a gate, a source, and a drain wherein the gate is connected to the output terminal of the NAND component, the source is connected to a power source, and the drain is connected to the output terminal of the tri-state logical block.

13. The tri-state I/O port according to claim 10 wherein the weak buffer is composed of two inverters which are in series connection.

14. The tri-state I/O port according to claim 13 wherein the weak buffer is composed of an inverter and a weak inverter in series connection.

15. The tri-state I/O port according to claim 10 wherein the weak buffer further connects to the enable input terminal for receiving the enable signal of the tri-state logical block inputted, the weak buffer only operates when the enable signal of the tri-state logical block is enabled.

16. The tri-state I/O port according to claim 10 wherein the delay block further comprises a delay and an inverter.

17. The tri-state I/O port according to claim 16 wherein the delay block is composed of a number of buffers in series connection.

18. The tri-state I/O port according to claim 16 wherein the delay time of the delay block is determined by the threshold voltage of a transistor.

* * * * *